No. 677,348. Patented July 2, 1901.
W. C. FISH.
CARBON BRUSH.
(Application filed Feb. 28, 1901.)
(No Model.)

Witnesses.
Marcus L. Byng.
Benjamin B. Hull.

Inventor.
Walter C. Fish,
by Albert G. Davis
Att'y.

THE NORRIS PETERS CO., PHOTO-LITHO., WASHINGTON, D. C.

UNITED STATES PATENT OFFICE.

WALTER C. FISH, OF LYNN, MASSACHUSETTS, ASSIGNOR TO THE GENERAL ELECTRIC COMPANY, OF NEW YORK.

CARBON BRUSH.

SPECIFICATION forming part of Letters Patent No. 677,348, dated July 2, 1901.

Application filed February 28, 1901. Serial No. 49,261. (No model.)

*To all whom it may concern:*

Be it known that I, WALTER C. FISH, a citizen of the United States, residing at Lynn, county of Essex, State of Massachusetts, have invented certain new and useful Improvements in Carbon Brushes, (Case No. 1,980,) of which the following is a specification.

This invention relates to carbon brushes for dynamo-electric machines; and its object is to improve the mode of attaching to such brushes the flexible braided-wire conductor or cable commonly employed to carry the current transmitted to or from the brush.

Heretofore the flexible braided metallic conductor has been attached to the brush either by soldering it directly to the copper-plated surface of the brush, or by fastening it in a transverse hole drilled through the brush, or by clamping and soldering it to a metallic clip, which is then in turn soldered to the copper-plating of the brush. The first method is unreliable owing to the difficulty of making a mechanically-strong joint between the brush and the cable. The second method is objectionable because the unequal expansion of the pig-tail and the carbon brush loosens the joint. The third method is satisfactory, but somewhat expensive.

My invention aims to cheapen the cost of a reliable brush and connection without encountering the difficulties attending the older forms. I omit the metal clip and attach the cable directly to the brush in an open slot or notch cut in the end or edge of the brush. By copper-plating the notch the cable can be readily soldered in place, and a subsequent copper-plating conceals the joint and makes a good electrical connection and, aided by the walls of the notch, a strong mechanical joint. The open notch permits a free expansion without loosening the joint.

Figure 1:
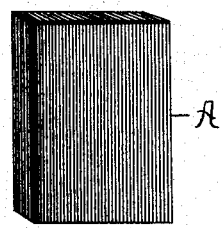
Figure 2:
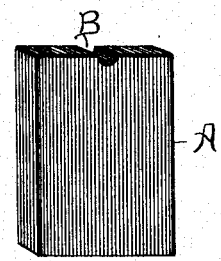
Figure 3:
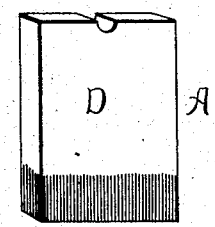
Figure 4:
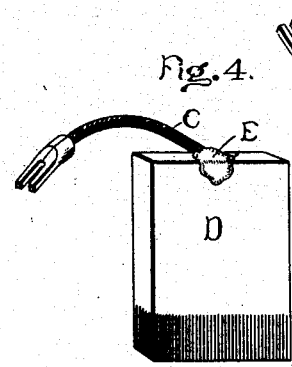
Figure 5:
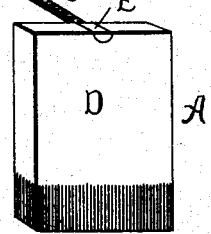
Figure 6:
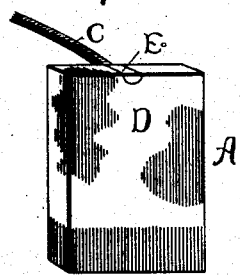
Figure 7:
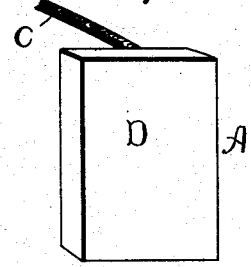
Figure 8:
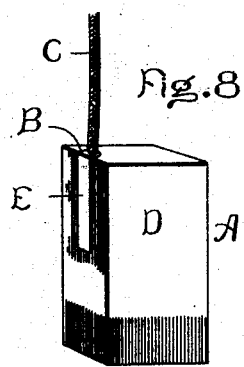

In the accompanying drawings, Figure 1 shows a carbon brush. Fig. 2 shows the brush with an open slot or notch cut in the upper end. Fig. 3 shows the same copper-plated. Fig. 4 shows the cable soldered into the notch. Fig. 5 shows the joint filed smooth. Fig. 6 shows the brush ground to gage. Fig. 7 shows the completed copper-plated brush. Fig. 8 shows the cable secured in a notch in the side of the brush.

The brush A is a rectangular block of carbon molded or cut to approximately the proper size. The first step in my process is to cut an open slot or notch B either transversely across the end of the brush, as in Fig. 2, or longitudinally along one edge or side thereof, as in Fig. 8. The notch is of a suitable width to receive the end of a flexible non-resilient braided metallic wire conductor C, commonly called a "pig-tail," the bottom of the notch being preferably rounded to fit and support the circular conductor. After the notch is cut the upper end of the brush is electroplated with copper or other good conducting metal D, as shown in Fig. 3. The end of the cable C is then fastened to the copper-plating in the notch by solder E, which solidly fills the notch, as shown in Fig. 4, and unites firmly with the thin film of copper D. The surplus solder is then filed off, as shown in Fig. 5, and the brush is filed or ground or otherwise dressed off to bring it to standard gage in width and thickness, as indicated in Fig. 6. As this step in the process removes some of the copper-plating, the brush is then replated, as shown in Fig. 7, the copper covering and concealing the joint between the cable and the brush and making a neat-looking article, besides affording a good electrical connection between the brush and the cable. The end of the cable is firmly supported by the walls of the notch, making a strong mechanical joint. This process is simple, expeditious, and cheap, saving from two to three cents per brush over such methods as were formerly known to me. That a mechanically-strong joint is formed is proved by the fact that a portion of the carbon around the end of the cable will break off with the latter if the pig-tail is purposely subjected to a severe strain.

In the modification shown in Fig. 8 the cable is brought out parallel with the length of the brush. This location gives a much longer groove or slot in which to fasten the brush, strengthening the joint and reducing its electrical resistance. Furthermore, the brush-holder does not have to be slotted down one side to permit the brush to feed down, as is the case when the cable projects laterally.

What I claim as new, and desire to secure by Letters Patent of the United States, is—

1. A carbon commutator-brush having an open notch, and a flexible conductor laid longitudinally and fastened in said notch.

2. A carbon commutator-brush containing an open notch, and a flexible conductor laid longitudinally and soldered in said notch.

3. A carbon commutator-brush having an open notch, and a flexible conductor received longitudinally in said notch in conducting relation with said brush.

4. A carbon commutator-brush having an open slot, a flexible conductor received longitudinally in said slot, and a mass of solder covering said conductor.

5. A carbon commutator-brush having an open notch, a flexible conductor received longitudinally in said notch, and a mass of solder filling said notch.

6. A carbon commutator-brush having an open notch, a flexible conductor received longitudinally in said notch, and a mass of solder in said notch and flush with the sides thereof.

7. A carbon brush having an open notch whose surface is electroplated, and a flexible conductor in contact with said surface.

8. A carbon brush having an open notch whose surface is electroplated, and a flexible conductor fastened against said surface.

9. A carbon brush having an open notch with an electroplated surface, and a flexible conductor soldered to said surface.

10. A carbon brush having an open notch with an electroplated surface, a flexible conductor received in said notch, and a mass of solder covering said conductor and united with said surface.

11. A carbon brush having an open notch with an electroplated surface, a flexible conductor received in said notch, and a mass of solder filling the notch and flush with the sides of the carbon.

12. A carbon brush having an open notch with an electroplated surface, a flexible conductor in said notch, a mass of solder filling the notch and fastening the conductor, and a film of electroplating covering the joint.

13. A copper-plated carbon commutator-brush having a braided-wire conductor laid longitudinally and soldered in a notch in said brush.

14. A copper-plated carbon brush having a braided-wire conductor soldered in a notch in said brush, and a coating of copper plate covering the joint and the upper part of the brush.

15. The method of connecting a flexible conductor with a carbon brush, which consists in notching the brush, electroplating the surface of the notch, laying the conductor in the notch, and soldering the two together.

16. The method of connecting a flexible conductor with a carbon brush, which consists in making a notch in the brush, electroplating the surface of the notch, laying the conductor in the notch, and filling the notch with solder.

17. The method of connecting a flexible conductor with a carbon brush, which consists in making a notch in the brush, electroplating the surface of the notch; laying the conductor in the notch, filling the notch with solder, and making the solder flush with the sides of the brush.

18. The method of connecting a flexible conductor with a carbon brush, which consists in notching the brush, electroplating the notch, laying the conductor therein, filling the notch with solder, and dressing off the solder and the brush to a gage.

19. The method of connecting a flexible conductor with a carbon brush, which consists in notching the brush, electroplating the notch, laying the conductor therein, filling the notch with solder, dressing off the solder and the brush, and electroplating them to cover the joint.

20. The combination with a carbon commutator-brush, of a flexible conductor laid longitudinally and fastened in a notch in a side of the brush, and extending therefrom in a line lengthwise of the brush.

In witness whereof I have hereunto set my hand this 20th day of February, 1901.

WALTER C. FISH.

Witnesses:
DUGALD McK. McKILLOP,
JOHN J. WALKER.